(12) United States Patent
Carroll et al.

(10) Patent No.: US 7,501,357 B2
(45) Date of Patent: Mar. 10, 2009

(54) VAPOR PERMEABLE, LIQUID IMPERMEABLE COMPOSITE FABRIC AND FABRICATION PROCESS

(75) Inventors: Todd R. Carroll, Guntersville, AL (US); John D. Langley, Guntersville, AL (US); Barry S. Hinkle, Guntersville, AL (US)

(73) Assignee: Kappler, Inc., Guntersville, AL (US)

( * ) Notice: Subject to any disclaimer, the term of this patent is extended or adjusted under 35 U.S.C. 154(b) by 0 days.

(21) Appl. No.: 10/175,325

(22) Filed: Jun. 19, 2002

(65) Prior Publication Data

US 2004/0023585 A1 Feb. 5, 2004

Related U.S. Application Data

(60) Provisional application No. 60/299,370, filed on Jun. 19, 2001.

(51) Int. Cl.
| | |
|---|---|
| *B32B 5/18* | (2006.01) |
| *B32B 27/12* | (2006.01) |
| *B32B 27/32* | (2006.01) |
| *B32B 37/00* | (2006.01) |

(52) U.S. Cl. ................ 442/131; 442/38; 442/76; 442/394; 442/398; 156/229

(58) Field of Classification Search .......... 442/56, 442/381, 389, 398, 417, 76, 77, 131; 154/229
See application file for complete search history.

(56) References Cited

U.S. PATENT DOCUMENTS

| | | | |
|---|---|---|---|
| 3,206,431 A | * | 9/1965 | Doyle et al. ............. 524/288 |
| 4,350,655 A | | 9/1982 | Hoge ....................... 264/145 |
| 4,472,328 A | | 9/1984 | Sugimoto et al. .......... 264/41 |
| 4,508,776 A | * | 4/1985 | Smith ....................... 442/230 |
| 4,582,750 A | | 4/1986 | Lou et al. |
| 4,684,568 A | | 8/1987 | Lou |
| 4,857,393 A | | 8/1989 | Kato et al. |

(Continued)

FOREIGN PATENT DOCUMENTS

EP 0127483 A2 12/1984

(Continued)

OTHER PUBLICATIONS

Middlesworth, et al.,; H1,955 issued Apr. 3, 2001; Polyolefin/filler films having increased WVTR and method for making.

*Primary Examiner*—Jenna-Leigh Johnson
(74) *Attorney, Agent, or Firm*—Stites & Harbison PLLC; Richard S. Myers, Jr.

(57) ABSTRACT

A flexible, vapor permeable, liquid impermeable composite fabric comprising a ultraviolet light stabilized and thermally stabilized microporous-formable polyolefin barrier layer extrusion laminated to an ultra-violet light stabilized and thermally stabilized polyolefin nonwoven fabric, the composite of which has been incrementally stretched to induce sufficient moisture vapor transmission characteristics while maintaining adequate resistance to water penetration, and methods of making the composite. This composite may be further laminated to one or more layers of either woven or nonwoven materials offering strength and environmental resistance characteristics sufficient for various outdoor applications including covers and building construction products. Embodiments of the above mentioned components have been shown to offer improved liquid resistance, environmental stability, and abrasion resistance as compared to existing commercially available materials.

39 Claims, 1 Drawing Sheet

U.S. PATENT DOCUMENTS

| | | | |
|---|---|---|---|
| 4,898,761 A | 2/1990 | Dunaway et al. | 428/137 |
| 4,929,303 A | 5/1990 | Sheth | 156/209 |
| 4,974,382 A | 12/1990 | Avellanet | 52/408 |
| 5,169,712 A | 12/1992 | Tapp | |
| 5,200,443 A * | 4/1993 | Hudson | 524/99 |
| 5,208,098 A | 5/1993 | Stover | |
| 5,368,920 A | 11/1994 | Schortmann | 442/76 |
| 5,382,461 A | 1/1995 | Wu | |
| 5,389,430 A * | 2/1995 | Yilgor et al. | 442/76 |
| 5,422,172 A | 6/1995 | Wu | |
| 5,593,771 A | 1/1997 | Lawless et al. | 428/317.3 |
| 5,594,070 A | 1/1997 | Jacoby et al. | 525/88 |
| 5,656,167 A | 8/1997 | Martz | 216/490 |
| 5,683,787 A | 11/1997 | Boich et al. | |
| 5,728,451 A | 3/1998 | Langley et al. | 428/198 |
| 5,733,824 A | 3/1998 | Brunka et al. | |
| 5,773,123 A | 6/1998 | Anwyll, Jr. | |
| 5,865,926 A | 2/1999 | Wu et al. | 156/229 |
| 5,888,614 A | 3/1999 | Slocum et al. | 428/132 |
| 5,919,177 A | 7/1999 | Georger et al. | |
| 5,972,147 A | 10/1999 | Janis | 156/181 |
| 6,013,151 A | 1/2000 | Wu et al. | |
| 6,048,118 A | 4/2000 | Jones et al. | |
| 6,071,834 A | 6/2000 | Martz | 442/51 |
| 6,100,208 A | 8/2000 | Brown et al. | 442/364 |
| 6,133,168 A | 10/2000 | Doyle et al. | 442/76 |
| 6,187,696 B1 | 2/2001 | Lim et al. | |
| 6,235,658 B1 | 5/2001 | Panzer et al. | |
| 6,258,308 B1 | 7/2001 | Brady et al. | 264/210.2 |
| 6,264,864 B1 | 7/2001 | Mackay | 264/154 |
| 6,300,257 B1 | 10/2001 | Kirchberger et al. | |
| H2000 H | 11/2001 | Middlesworth et al. | |
| 6,355,333 B1 | 3/2002 | Waggoner et al. | 428/174 |
| 6,359,050 B1 | 3/2002 | Dohrer et al. | 524/425 |
| 6,506,695 B2 | 1/2003 | Gardner et al. | |
| 6,656,581 B2 * | 12/2003 | Wu et al. | 428/315.5 |
| 2002/0055316 A1 | 5/2002 | Araida et al. | |
| 2002/0132547 A1 | 9/2002 | Grodin et al. | |
| 2005/0014431 A1 | 1/2005 | Carmody et al. | |

FOREIGN PATENT DOCUMENTS

| | | |
|---|---|---|
| EP | 0685586 A2 | 12/1995 |
| WO | 1997029909 A1 | 8/1997 |

* cited by examiner

VAPOR PERMEABLE, LIQUID IMPERMEABLE COMPOSITE FABRIC AND FABRICATION PROCESS

The present invention claims priority to U.S. Application Ser. No. 60/299,370, filed Jun. 19, 2001, the contents of which are incorporated herein by reference.

FIELD OF INVENTION

This invention relates generally to outdoor cover materials and more specifically for use as covers for cars, recreational vehicles, outdoor furniture, boats, jet skis, and the like, and, to air and liquid infiltration barriers used in the building construction industry such as housewrap and roofing underlayment membranes. The cover materials of the present invention are microporous and have air and moisture permeability characteristics, but act as a liquid barrier.

BACKGROUND OF THE INVENTION

Numerous materials have been used in barrier sheets, composites or materials used for outdoor cover and building construction applications. Such barrier materials are designed to prevent the intrusion of water, including incidental water, which may damage the object covered. In the case of building construction, the water may pass through the primary facade of the building or house, into the frame of the structure where water could cause mold, mildew, rotting, or other structural damage. Some barrier materials may also prevent the infiltration of air (and the moisture entrained with such air) into the structure or covered item. In the case of construction, this is thought to make the structure more comfortable and energy efficient. While the barrier composites should be impermeable to liquid, it is preferable that they not trap moisture vapor where the vapor could condense as water and cause mildew or structural damage. This condition is known as "sweating." Accordingly, it is most desirable to have a barrier composite that prevents the flow of water, while allowing passage of the vapor.

Traditionally, these cover materials could be segregated generically as either porous in the case of cotton canvas, cotton/polyester blends, 15# asphalt building felt, and perforated polyolefin-coated substrates, or as nonporous in the case of flash-spun high density polyethylene, and various separable microporous film composites. In the case of non-building applications these materials are used primarily to protect items from direct sunlight, dirt, dust, rain, and insect infestation. In the case of building products, these materials are used as weatherization membranes during and after construction under exterior coverings such as vinyl, wood, brick, stucco, stone, concrete siding composites, and over traditional sheathing materials such as plywood and OSB to prevent air infiltration and water infusion into the house to improve the overall efficiency of the home. The traditional advantage of porous cover materials has been lower cost at the expense of higher rates of air and water infiltration. The advantage of nonporous materials has been a combination of both low rates of air infiltration and water infusion with the unique characteristic of high rates of "breathability" (i.e., moisture vapor transmission), however, typically at a premium price.

In other embodiments of the present invention, the composite of the present invention may be used as seam tape to make liquid impermeable, breathable seams. In this embodiment, the seam tape may be used where traditional seam tape is used, or in areas where fabric is sewn. For example, the composite of the present invention may be used in connecting adjoining pieces of housewrap or on seams of three-dimensional outdoor covers.

The housewrap market is lead by a flash-spun high-density polyethylene available under the tradename Tyvek® Home-Wrap® (E.I. duPont de Nemours & Company of Wilmington, Del. (DuPont®)), which is marketed as a non-perforated product, and numerous lower cost perforated polyolefin-coated substrates such as Barricade® (Simplex), Typar® (Reemay), PinkWrap® (Dow Corning), AmoWrap® (Tenneco), and ChoiceWrap® (Weyerhaeuser).

Several manufacturers have offered or have patented outdoor cover material composites. For example, Sheth, U.S. Pat. No. 4,929,303, the contents of which are incorporated herein by reference, discloses a composite breathable film comprising a breathable polyolefin film heat laminated to a nonwoven HDPE fabric.

Martz, U.S. Pat. Nos. 5,656,167, and 6,071,834, the contents of both patents being incorporated herein by reference, discloses a breathable membrane that is reinforced with filaments that extend linearly to form a matrix.

The above Sheth patent and the above Martz patents utilize free microporous films laminated to various supporting substrates that could compete against Tyvek® in the non-perforated sector of the housewrap market.

Other barrier composites include Doyle et al., U.S. Pat. No. 6,133,168, the contents of which are incorporated herein by reference, who disclose a barrier composite that comprises a substrate, a monolithic extrusion coated breathable polymer layer, and a primer layer intermediate and adhered to the substrate and the monolithic, extrusion coated breathable layer.

Slocum et al., U.S. Pat. No. 5,888,614, the contents of which are incorporated herein by reference, disclose a barrier film that comprises multiplicities of micropunctures formed in the film to allow vapor transmission.

Lawless et al., U.S. Pat. No. 5,593,771, the contents of which are incorporated herein by reference, disclose a barrier laminate that comprises a flexible elongate barrier layer having minute passageways between its major surfaces affording passage of water vapor while restricting the passage of liquid and air between its major surfaces.

Schortmann, U.S. Pat. No. 5,368,920, the contents of which ate incorporated herein by reference, discloses a breathable barrier fabric that is made by sizing a substrate made of bonded fibers forming void spaces therein, with a film-forming material that fills the voids of the substrate to form a solid film between the fibers.

Avellanet, U.S. Pat. No. 4,974,382, the contents of which are incorporated herein by reference, discloses a barrier that comprises a flexible substrate sheet having at least one metalized layer thereon. The substrate sheet may be a flexible material such as a polyester sheet.

Dunaway et al., U.S. Pat. No. 4,898,761, the contents of which are incorporated herein by reference, disclose a barrier fabric that is a polymer film laminated to a porous web. The composite web is then needled repeatedly with fine conical needles to provide micropores through the film.

The above prior art fails to disclose or otherwise adequately address the necessity of the housewrap products or outdoor cover materials to resist environmental stresses during and after construction. For example, with respect to construction, the Uniform Building Codes (UBC), the International Conference of Building Officials (ICBO), and the Standard Building Code (SBC) all AO require various test requirements on weather-resistive barriers. ICBO in their *Acceptance Criteria for Alternate Water-Resistance Test*

*Methods For Nonpaper-Based Weather Resistive Barriers* requires preconditioning according to both UV exposure and accelerated aging prior to measuring product performance.

Traditional additive practices have proven reasonably successful in environmentally stabilizing the monolithic films present in the perforated products such as Barricade® and Typar®. However, common stabilizing techniques have not been successful in stabilizing the class of non-perforated products based on separable microporous polyolefin films. Without being bound by theory, it is believed that one reason is the tremendous surface area contained within the structure of a traditional microporous film, which challenges the performance capabilities of commercially available UV stabilizers and even defies Beer's Law which was traditionally practiced by those schooled in the art of environmental stabilization.

According to Beer's Law, absorption of damaging UV radiation is influenced by additive concentration and the distance the light must travel through the film. In other words, greater UV stability can be achieved by adding, greater quantities of UV additives and/or by increasing product thickness.

UV absorbers (UVAs), such as those benzotriazoles available from Ciba-Geigy perform as described by absorbing the damaging UV radiation passing into and through a material. An alternative approach to reducing the affects of photodegradation is with the use of light stabilizers commonly known as hindered amine light stabilizers (HALS), also available through Ciba-Geigy under the tradename Chimassorb®. While UVAs absorb the radiation, HALS function by an alternative mechanism and is not constrained by Beer's Law. Therefore, HALS are traditionally effective at the surface and in comparison are typically more effective than UVAs.

Traditional separable microporous structures can not be easily stabilized using common additive strategies. Additionally, the present inventors have observed product failures due to thermal degradation, especially in housewrap and roofing underlayment materials based on separable microporous polyolefin films.

Accordingly, a need exists for a microporous polyolefin barrier layer that is ultra-violet light and thermally stabilized.

SUMMARY OF THE INVENTION

The present invention provides a flexible, vapor permeable, substantially liquid impermeable composite fabric comprising a ultraviolet light stabilized and thermally stabilized microporous-formable polyolefin barrier layer extrusion laminated to an ultraviolet light stabilized and thermally stabilized polyolefin nonwoven fabric. In embodiments of the present invention, the extrusion laminated barrier layer forms a non-separable composite with the nonwoven fabric. This composite is incrementally stretched to induce moisture vapor transmission characteristics while maintaining resistance to water penetration. Substantial liquid impermeability can be determined by one of ordinary skill in the art and varies depending on the end use of the product. For example, with respect to housewrap embodiments of the present invention, liquid impermeability can be measured using ASTM F-903. Additionally, sufficient stabilization can be determined by one of ordinary skill in the art. The composites of the present invention are stabilized to minimize the deleterious effects of photo degradation and/or autooxidation and thermooxidation upon exposure to UV irradiation and/or upon outdoor exposure.

Superior and unexpected synergistic effects are realized when the stabilizer additives are incorporated into an incrementally stretched, non-separable microporous barrier layer as compared to the results observed with variations of separable microporous composites. The microporosity present in the majority of traditional commercially available separable microporous films is created by tentering or stretching the film monoaxially or biaxially according to common techniques as described by Sugimoto, U.S. Pat. No. 4,472,328; Jacoby et al., U.S. Pat. No. 5,594,070; and Hoge, U.S. Pat. No. 4,350,655; and Sheth '303, all of which are incorporated herein by reference. These tentering techniques impart a uniform degree of microporosity (i.e., breathability) across the entire web of the fabric.

Without being bound by theory, it is the incremental stretch and thus, the incremental microporosity of the present invention that enables this fabric to respond more favorably to environmental stabilization than the traditional separable microporous films that exhibit uniform "breathability".

In preferred embodiments of the present invention, the nonporous performance characteristics can be achieved through the use of a microporous-formable calcium carbonate filled polyolefin resin in a high-speed process which produces a non-separable microporous composite precursor which subsequently can be laminated to one or more additional layers of support material by various thermal, ultrasonic, or adhesive techniques.

The composite nature of the non-separable precursor, which is manufactured according to Wu (U.S. Pat. No. 5,865,926, incorporated herein by reference) induces greater abrasion resistance to the final fabric than similar products that rely on the composites using separable microporous films. An unexpected result of the present invention is the enhanced environmental stability characteristics resulting from the incremental stretching of the microporous-formable resin combined with the synergistic use of ultra-violet light stabilizing additives when used in combination with anti-oxidation additives. The incremental stretching of the present invention results in a precursor that has defined areas that alternate in their degree of microporosity and thus breathability linearly across the web of the composite.

In other embodiments of the present invention, the composite or fabric can be further laminated off-line to one or more layers of a strength enhancing scrim either thermally or ultrasonically. Alternatively, the composite can be further laminated in-line to a strength enhancing scrim during the production of such scrim. In yet another embodiment, the composite can be further laminated to a strength enhancing scrim in-line after incremental stretching yet prior to wind-up of the final composite.

In other embodiments of the present invention, the composite can be configured to closely match the shape of an item to be covered. These embodiments offer protection from environmental hazards present in the outdoors, including exposure to sunlight, rain, acid rain, wind, snow, sleet, hail, dirt and dust, pollen, insect infestation, etc. The items that can advantageously be covered include cars, recreational vehicles, outdoor furniture, grills, or boats, to name a few examples.

The permeability to moisture vapor offered by the subject matter of the present invention has the added advantage that covered items, including houses in the case of building products, will allow sufficient moisture to escape from the covered item to minimize or eliminate the potential for mold and other bacterial growth, as well as prevent water build-up and the potential for rot of wood and other related building materials.

Depending on the final layer profile, the subject fabric can be seamed according to various high speed assembly techniques including traditional needle and thread sewing, ultrasonic heat sealing, hot-air welding, impulse welding, and radio-frequency welding, the final seam of which can be tailored to met the strength and liquid barrier requirements of the specific end-use application.

A preferred embodiment of the present invention is directed to a microporous barrier composite, comprising a flexible, vapor permeable, substantially liquid impermeable polyolefin barrier layer that comprises an ultra-violet light (UV) stabilizer and a thermal stabilizer; and a fabric layer. In a preferred embodiment, the composite is incrementally stretched along lines that transverse the composite and throughout the depth of the composite to provide microporosity. Lines that transverse the composite include lines in the "machine direction" and/or lines in the "cross direction." The degree of stretching along those lines is substantially uniform.

Another embodiment of the present invention is directed to a process of making a composite of the present invention. Another preferred embodiment of the invention is directed to a process for making a microporous barrier composite that comprises providing a polyolefin blend that comprises a ultra-violet light stabilizer and a thermal stabalizer; providing a nonwoven fabric; introducing the polyolefin blend onto the nonwoven fabric to form a non-separable laminate; and applying an incremental stretching force at below the melting point of said polyolefin blend to the laminate along lines that transverse the laminate to form a microporous barrier composite.

A further embodiment of the present invention comprises a method of making a polyolefin film composite, comprising providing a polyolefin mixture that comprises a UV stabilizer and a thermal stabilizer; providing a fabric support layer; providing at least one non-woven strength-enhancing layer; extruding the polyolefin mixture to form a polyolefin mixture film; and ultrasonically bonding the polyolefin mixture film to at least one non-woven strength-enhancing layer to form a substantially pin-hole free polyolefin film composite.

DESCRIPTION OF PREFERRED EMBODIMENTS

Figure 1:
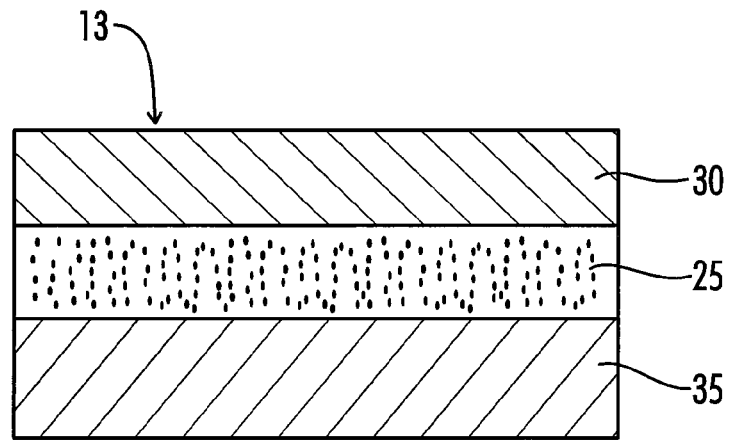
FIG. 1 shows, schematically, an embodiment of the microporous barrier composite of the present invention.

Numerous embodiments have been fabricated and evaluated to demonstrate the potential breadth and significance of the present invention. Further, the present invention encompassed several lamination techniques for combining the non-separable microporous precursor with various strength enhancing substrates to satisfy the physical requirements of a range of end-use applications. Additionally, several embodiments were further modified by vacuum metallization as a method of increasing the radiant barrier protection without sacrificing the breathability and moisture vapor transmission offered by the material, which makes this embodiment especially attractive as a building product.

As stated above, a preferred embodiment of the present invention is directed to a microporous barrier composite, comprising a flexible, vapor permeable, essentially liquid impermeable polyolefin barrier layer that comprises an ultra-violet light (UV) stabilizer and a thermal stabilizer; and a fabric layer. In this embodiment, the composite is incrementally stretched along lines that transverse the composite and throughout the depth of the composite to provide microporosity.

The polyolefin of the present invention can be any film-forming polyolefin. Preferred polyolefins include polyethylene, polypropylene, metallocenes, and blends thereof, as well as blends of polyolefins with other polymers.

The polyolefin barrier layer comprises a filler. The fillers that may be used in conjunction with the present invention include those fillers that are typically used with polyolefin films. Generally speaking, the filler material may be any mechanical pore-forming agent that does not adversely affect the properties of the present invention. More specifically, the fillers that may be used in connection with the present invention may be inorganic or organic material having a low affinity for and a significantly lower elasticity than the polyolefin component. Preferably the filler should be a rigid material having a non-smooth hydrophobic surface, or a material which is treated to render its surface hydrophobic. Examples of the inorganic and organic fillers include calcium carbonate, talc, clay, kaolin, silica, diatomaceous earth, magnesium carbonate, barium to carbonate, magnesium sulfate, barium sulfate, calcium sulfate, aluminum hydroxide, zinc oxide, magnesium hydroxide, calcium oxide, magnesium oxide, titanium dioxide, alumina, mica, glass powder, zeolite, silica clay, acetyl salicylic acid, molecular sieves, ion exchange resins, wood pulp, pulp powder, ferrous hydroxide, borox, soda line, alkaline earth metals, baking soda, activated alumina, etc. Calcium carbonate is particularly preferred for low cost, whiteness, inertness, and availability. The inorganic filler such as calcium carbonate may be preferably surface treated to be hydrophobic so that the filler can repel water to reduce agglomeration of the filler. Also, the surface coating should improve binding of the filler to the polymer while allowing the fuller to be pulled away from the polyolefin under stress. A preferred coating is calcium stearate which is FDA compliant and readily available. Organic fillers such as wood powder, and other cellulose type powders may be used. Polymer powders such as Teflon® powder and Kevlar® powder can also be used.

The amount of filler added to the polyolefin base resin depends on the desired properties of the film including tear strength, water vapor transmission rate, and stretchability. In one embodiment of the present invention, the barrier layer comprises any amount from about 10 to 80% by weight inorganic filler, preferably about 17 to 67%, and more preferably about 25 to 60% by weight inorganic filler.

In embodiments of the present invention, the stabilizers incorporated into the barrier layer of the present invention are those typically used to induce weathering resistance for polymers. The preferred stabilizer package of the present invention is a UV stabilizer and a thermal stabilizer. In preferred embodiments of the present invention, the UV stabilizer is one or more UV absorbers (UVA) such as a benzotriazole or benzophenone, or one or more hindered amine light stabilizers (HALS). The selected UV stabilizers may be used separately or in combination with one another. Generally speaking, the UV stabilizer may be present in the amount of from about 500 to 20,000 ppm, or in the range of about 0.5 to about 2% by weight of the barrier layer of the present invention. The thermal stabilizer in the barrier layer may be selected from the group consisting of phenolic stabilizers, organo phosphorous compounds (i.e., hydroperoxide decomposers), lactone and hydroxyl amine radical scavengers. The thermal stabilizer may be present in an amount of from about greater than 0% to about 1% by weight.

FIG. 1, while not drawn to scale, shows the relationship of the layers of the composite 13 of the present invention. In the embodiment shown in this Figure, the barrier layer 25 is laminated onto the fabric layer 30. This embodiment has a strength-enhancing substrate 35 or scrim. In alternative embodiments, the barrier layer may be on top of the fabric layer.

The polyolefin barrier layer is bonded to a fabric layer, which provides strength and support to the barrier layer. Further, the fabric layer of the present invention includes any fabric which can be bonded to the breathable film without adversely affecting the water vapor permeability or the resistance to air permeability of the breathable film, i.e. the fabric must generally have a suitably open mesh to avoid substantially blocking the micropores of the breathable film. The fabric may be woven of any suitable material, but is preferably a nonwoven polyolefin such as polyethylene, high density polyethylene, low density polyethylene, polypropylene, polyester, nylon, and blends thereof, including bicomponent fibers.

Preferably, the fabric layer is polyolefin nonwoven fabric. More preferably, the fabric layer further comprises an ultra-light stabilizer and a thermal stabilizer.

The barrier layer may be bonded to the fabric layer and incrementally stretched as disclosed in Wu, '926. Therefore, in embodiments of the present invention, this method involves lamination by extrusion or adhesion of the fabric layer to the barrier layer.

In a preferred embodiment, this method is conducted on high-speed production machinery on the order of about 200-500 fpm. More specifically, a fabric layer is introduced into a nip of rollers for extrusion lamination with a barrier layer film or extrudate. A thermoplastic barrier layer extrudate is extruded into the nip at a temperature above its softening point to form a film laminated to the fabric layer. The compressive force between the fabric layer and extrudate is controlled to bond one surface of the fabric layer to the barrier layer film to form the microporous barrier composite. The composite may also be formed by adhesively bonding the fabric layer to the barrier layer. The thus formed composite is then incrementally stretched along lines across the laminate and throughout its depth to render the film microporous. By applying an incremental stretching force to the composite, both the fabric layer and the barrier layer are stretched. Without being bound by theory, incrementally stretching the composite, preferably at below the melting point of the barrier layer film, where the polyolefin barrier layer contains a filler (such as calcium carbonate), causes microporosity to develop in the film whereby the film is capable of transmitting moisture vapor and air, but acts as a barrier to the transmission of liquid.

As an example of the process of the present invention, the composites of the present invention may be incrementally stretched with the stretchers and techniques described by Wu, '926 as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45.degree. helix angle, a 0.100" normal pitch, 30 diametral pitch, 14½.degree. pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14.5° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched composite of this invention. The stretching operation is usually employed on an extrusion laminate of the barrier layer and fabric layer. The laminate of nonwoven fibrous web and microporous-formable film is incrementally stretched using, for instance, the CD and/or MD intermeshing stretcher with one pass through the stretcher with a depth of roller engagement at about 0.060 inch to 0.120 inch at speeds from about 200 fpm to 500 fpm or faster. The results of such incremental or intermesh stretching produces laminates that have excellent breathability and liquid-barrier properties, yet provide superior bond strengths and soft cloth-like textures.

Figure 2:
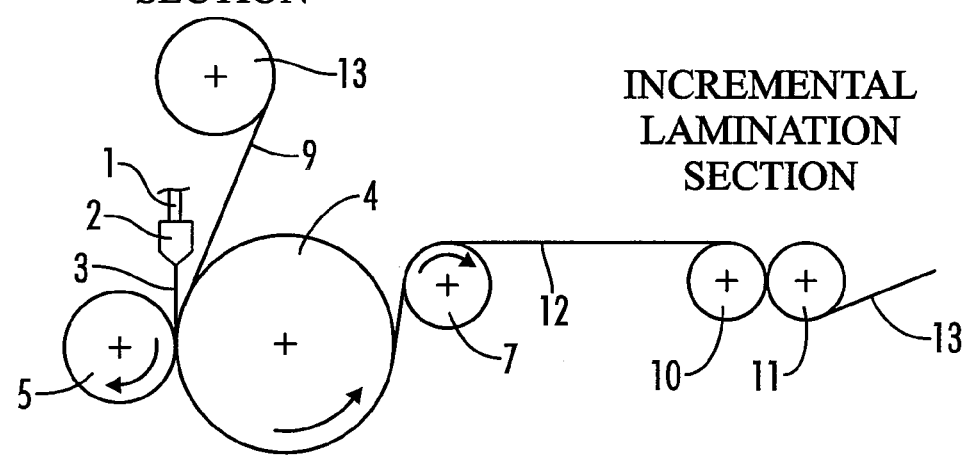
FIG. 2 shows an example of the process of making a microporous barrier composite of the present invention.

FIG. 2 shows a schematic of a process of making the composite of the present invention. This embodiment is an extrusion laminator. As shown in the Figure, the incoming fabric layer 9 from roller 13 is introduced into the nip of a rubber roll 5 and a metal roll 4. The polyethylene extrudate or film 3 from extruder 1 was extruded through die 2 into the nip while the fabric layer is 9 was introduced. Typically, at speeds over 300 fpm in this extrusion lamination section, the polyethylene film of the barrier layer 3 on the order of about 0.25 to 10 mils in thickness is laminated at melt temperatures on the order of about 400.degree.-500. degree. F. to form the laminate 12 which is taken off at roller 7. The compressive force at the nip is controlled such that the webs are bonded to the polyolefin film to avoid pinholing and preserve the fibrous feel on the fiber surfaces of the laminate 12. Pressures on the order of about 10 to 80 psi are sufficient to achieve satisfactory bond for fibrous webs of about 5 to 75 grams/yd.sup.2. The laminate at this point does not show any air flow.

While the pressure at the nip of rolls 4,5 is used to laminate the web and film 3, it should be understood that a vacuum roller can also be used at the nip to cause lamination.

The incoming laminate 12 at an ambient temperature of about 70-90° F. was passed through the CD incremental stretcher rollers 10 and 11 at a depth of roller engagement of about 0.100" at about 300 fpm, a microporous barrier composite 13 of this invention was formed.

The microporous barrier composite of the present invention may further comprise at least one strength-enhancing scrim, or a strength-enhancing substrate.

The scrim may be selected from traditional woven and nonwoven strength-enhancing materials, including open mesh scrim and thermoplastic binders. Preferred are based from polyolefin, polyethylene, low density polyethylene, high density polyethylene, metallocene, nylon, bicomponent fibers, and/or blends, including those available under the tradenames CLAF® (Anci, Atlanta, Ga.) and Typar® (Reemay Inc., Old Hickory, Tenn.).

The scrim is laminated to the composite according to techniques common in the art including ultrasonic, adhesive, and thermal bonding.

Preferred embodiments of the present invention include composites where the barrier layer that comprises from about 17 to about 82% by weight of low density polyethylene; from about 17 to about 67% by weight of a filler material; from about 0.5 to about 2% by weight of an UV stabilizer; and from about greater than 0% to about 1% by weight of a thermal stabilizer.

In one embodiment, the composite of the present invention is calendared to provide different surface characteristics for aesthetic or coefficient of friction purposes. In other embodiments, the composite of the present invention has a metallized surface.

The examples of the present invention provided in the following Tables and description are embodiments presented for exemplary purposes and are not intended to limit the scope of the present invention in any way.

Table 1, below, summarizes a sampling of the subject embodiments with relevant environmental aging information. Several different types (i.e., spun-bonded polypropylene (SBPP), and spun-bonded melt-blown spun-bonded polypropylene (SMS)) and weights of environmentally stabilized, polypropylene nonwovens (i.e., available through BBA Nonwovens) are used as strength enhancing substrates. Traditional methods and additives are used to stabilize all of the substrates. All of the embodiments included in Table 1 are fabricated ultrasonically as described by Langley (U.S. Pat. No. 5,728,451) which is incorporated herein by reference. The disclosure of the Langley patent can be used as a guide to produce acceptable ultrasonic laminations of polypropylene microporous films (i.e., the fabric layer of the present invention to polypropylene-based nonwovens.

In prior art processes, ultrasonic lamination was attempted, but with the occurrence of excessive numbers of pinholes which rendered the material unacceptable as an air and water infiltration barrier in the building construction industry or outdoor cover market. This result has forced manufacturers to opt for adhesive laminations such as that described by Seth. Adhesive laminations obviously have the disadvantage of potential contamination of the covered item if contacted by adhesive that might migrate out of the composite as a result of exposure to environmental stresses such as extreme temperatures.

An unexpected result of the present invention is that acceptable ultrasonic laminations were fabricated from the environmentally stabilized, polyethylene-based precursor produced according to the Wu process. Without being bound by theory, it appears that the addition of UV and antioxidant additives to the precursor stabilizes the polyethylene sufficiently to allow to for the production of essentially pin-hole-free ultrasonic laminations to polypropylene nonwovens.

The "precursors" described in the following embodiments represent the non-separable microporous barrier layer formed from a microporous-formable resin comprising, in preferred embodiments, about 47% by weight Dow 721 low density polyethylene that is compounded with about 49% calcium carbonate filler, and about 4% titanium dioxide pigment which contains less than about 1% by weight antioxidant (i.e., Ciba-Geigy Irgonox B900), the precursor of which is extruded and incrementally stretched according to Wu.

For the purposes of the examples herein, a 1.5 oz environmentally stabilized SBPP, available from BBA Nonwovens, is used in the precursor composite in all embodiments. The environmental stabilization package compounded into the "precursor" consists essentially of ~1% by weight, or ~10, 000 ppm of HALs (i.e., Chimassorb® 783) and ~0.5% by weight, or ~5000 ppm of UVAs (i.e., Tinuvin® 081), both available through Ciba-Geigy. The majority of separable microporous films (i.e., barrier layers) used in these examples were variations of BP's Aptra® AP3 polypropylene-based microporous film which are manufactured essentially according to Jacoby, '070. The AP3 described as UV4 in Table 1, represents the fourth iteration of additive package, and includes ~9500 ppm of HALs (i.e., Chimassorb® 944). The AP3 described as UV8 in Table 1 represents the eight iteration of additive package, and included ~9500 ppm of HALs (i.e., Chimassorb® 119) and 3000 ppm of UVAs. Both UV4 and UV8 also included ~600 ppm Tinuvin® 622 and a small amount of titanium dioxide for opacity.

A secondary alternative separable microporous film is also included which was an experimental product sourced through Tredegar.

While other microporous-formable resins and additive concentrations and packages can be used, these embodiments serve to demonstrate the unique and unexpected improvement in environmental stability offered by the non-separable microporous composite as compared to traditional separable microporous films.

Embodiments 1 & 2 represent controls, which do not contain any environmental additive packages in the microporous layers of the respective composites. Embodiments 3-24 represent iterations of various composites that may be used in outdoor cover applications.

It is evident from Table 1 that variations of the present invention embodiments show improvements in stability when tested according to both the Q-Trac (Q-Lab Weathering Research Services, Buckeye, Ariz.), and natural outdoor UV exposure scenarios at Q-Labs Homestead, Florida facility. Q-Trac is an exposure table designed by Q-Panel Lab Products (Cleveland, Ohio) that intensifies and focuses natural solar irradiation onto a sample through a series of reflective mirrors. Samples are evaluated after specific energy equivalents that can be extrapolated to an expected exposure to natural sunlight in South Florida, which is a common reference point when citing UV resistance. The Q-Trac is effective at accelerating outdoor testing but can exaggerate actual performance under normal exposure conditions for certain products which appear to be the case for the non-separable composites. That is, the present invention embodiments appear to show improvements under the Q-Trac exposure conditions with even greater improvements realized during the natural outdoor exposures.

Embodiments 3 & 4 demonstrate that the present invention may not be significantly dependent on the thickness of the non-separable microporous layer, which defies Beer's Law as mentioned above.

Embodiments 5 & 6 demonstrate the difficulty in stabilizing traditional separable microporous films and that fact that here again Beer's Law does not seem to apply to microporous films. The drastic improvement in thermal resistance of the present invention embodiments is also evident from Table 1.

Embodiment 7 demonstrates the difficulty in stabilizing an alternative separable polypropylene microporous film. Embodiments 9-12 demonstrate that variations in additive package and thickness do not appear to induce any measurable improvement in the overall environmental stability of a traditional separable polypropylene-based microporous films.

Embodiments 13-24 demonstrate the superior performance of the non-separable, subject precursor, which has been subsequently ultrasonically laminated to a polypropylene nonwoven, as compared to similar composites comprising traditional separable microporous composites.

TABLE 1

ENVIRONMENTAL AGING

| No | Composite Structure | Qtrac Results[¥] (joules) | | | | Outdoor Results[¥¥] (months) | | | | Thermal Resistance (120 days @ 165°) |
|---|---|---|---|---|---|---|---|---|---|---|
| | | 70 | 140 | 210 | 280 | 4 | 6 | 9 | 12 | |
| 1 | 2.7 oz SMS//30 gsm precursor Note: Control, no UV additives in precursor | N/t | N/t | N/t | N/t | N/t | N/t | N/t | N/t | D |
| 2 | 2.7 oz SMS//AP3 Note: Control, no UV additives in fiim | N/t | N/t | N/t | N/t | D | F | F | F | F |
| 3 | 1 oz brown SBPP//30 gsm precursor | D | C | D+ | C− | B+ | C+ | D | A | A |
| 4 | 1 oz brown SBPP//60 gsm precursor | A− | A− | B− | C | A− | A | B | A | A |
| 5 | 1 oz brown SBPP//1.5 mil UV4(AP3) | C | C | D+ | F | C | F | F | F | D |
| 6 | 1 oz brown SBPP//2 mil UV4(AP3) | C | B− | D | F | C | F | F | F | D |
| 7 | 1 oz brown SBPP//Tredegar//1 oz brown SBPP | D | D | F | F− | F | F | F | F | F |
| 8 | 2.7 oz SMS//60 gsm precursor | A | A | A | A | A | A | A | A | A |
| 9 | 1 oz brown SMS//2 mil UV8//1 oz brown SBPP | B | F | F | F | N/t | N/t | N/t | N/t | N/t |
| 10 | 2 oz brown SMS//2 mil UV8(AP3)//1 oz brown SBPP | A | C− | F | F | N/t | N/t | N/t | N/t | N/t |
| 11 | 1 oz brown SMS//3 mil UV8(AP3)//1 oz brown SBPP | A | C | F | F | N/t | N/t | N/t | N/t | N/t |
| 12 | 2 oz brown SMS//3 mil UV8(AP3)//1 oz brown SBPP | A | C | F | F | N/t | N/t | N/t | N/t | N/t |
| 13 | 2 oz brown SMS//60 gsm precursor | A | A− | B+ | B | N/t | N/t | N/t | N/t | N/t |
| 14 | 1 oz brown SMS//60 gsm precursor | A | B+ | B+ | B | N/t | N/t | N/t | N/t | N/t |

TABLE 1-continued

ENVIRONMENTAL AGING

| Composite | | Qtrac Results[¥] (joules) | | | | Outdoor Results[¥¥] (months) | | | | Thermal Resistance |
|---|---|---|---|---|---|---|---|---|---|---|
| No | Structure | 70 | 140 | 210 | 280 | 4 | 6 | 9 | 12 | (120 days @ 165°) |
| 15 | 60 gsm precursor//1 oz brown SBPP | A | C | A | C | N/t | N/t | N/t | N/t | N/t |
| 16 | 1.5 oz desert dust SMS//60 gsm precursor | A | B+ | A− | A− | N/t | N/t | N/t | N/t | N/t |
| 17 | 1.0 oz desert dust SMS//2 mil UV8(AP3)//1.0 oz desert dust SBPP | A | B+ | F | F | N/t | N/t | N/t | N/t | N/t |
| 18 | 1.5 oz desert dust SMS//2 mil UV8(AP3)//1.0 oz desert dust SBPP | A | F | F | F | N/t | N/t | N/t | N/t | N/t |
| 19 | Tri-laminate precursor | N/t | A | A | A− | N/t | N/t | N/t | N/t | N/t |
| 20 | 30 gsm precursor//1.0 oz gray SBPP | N/t | A | A | A− | N/t | N/t | N/t | N/t | N/t |
| 21 | 1.0 oz gray SBPP//30 gsm precursor | N/t | A | A | A− | N/t | N/t | N/t | N/t | N/t |
| 22 | 45 gsm precursor//1.0 oz gray SBPP | N/t | A | A | A− | N/t | N/t | N/t | N/t | N/t |
| 23 | 1.0 oz gray SBPP//45 gsm precursor | N/t | A | A | A− | N/t | N/t | N/t | N/t | N/t |
| 24 | 30 gsm precursor//30 gsm precursor | N/t | A | A | A− | N/t | N/t | N/t | N/t | N/t |

Note:
A = no appreciable change
B = slight visual change (some powdering of film allowed)
C = moderate visual change (film cracks when stretched)
D = severe visual change (film cracks w/o stretching)
E = catastrophic failure
[¥]Q-Track weather conducted by Q-Panel at Arizona test facility
[¥¥]Outdoor weather conducted on by Q-Panel at South Florida test facility.
Energy Equivalents:  70 joules  ~3 months in South Florida
 140 joules  ~6 months in South Florida
 210 joules  ~9 months in South Florida
 280 joules  ~12 months in South Florida Table 2, below, includes various embodiments of candidate building products and higher strength composites as might be useful as mooring and trailerable boat covers and the like. Three of the more important performance criteria were measured on these embodiments as compared to several commercially available products. Tensile testing, measured in lb$_f$/in, was conducted in accordance with ASTM D882-95a at a crosshead speed of 12 in/min. Moisture vapor transmission testing was conducted according to ASTM E96 using the upright cup procedure at ambient conditions, results are presented in terms of "perms" which a unit common in the building products industry. "Cedar Tea" testing was conducted according to ASTM F903, however reporting the pressure at which penetration was observed of a liquor made by extracting Cedar oil in water. This test was used to demonstrate the improved barrier properties and liquid holdout efficiency of the present invention to a known field failure mode. Failures of commercially available housewrap materials have been noted when used under Cedar siding. Typically, the back facing of Cedar siding is not finished, which, when exposed to water over time will allow for the extraction of various surfactants. Over time, it has been know that these surfactants can cause both perforated and non-perforated housewraps to fail.

Embodiments 25 & 26 are commercially available housewraps. Embodiments 27 & 28 represent examples of laminating the incrementally stretched microporous-formable precursor to a strength enhancing scrim in-line as the scrim is being manufactured. Adhesion is achieved as a result of the thermal-plastic binder, polyethylene in this example, bonding to the microporous surface of the precursor during nipping of the composite prior to wind-up. One can see from Table 2 that strength can be adjusted by modifying the end counts and/or denier of the fibers, as well as by substituting alternative fibers and/or composite fibers (i.e., PET, glass, nylon, polypropylene, Nomex, cotton, etc.) The moisture vapor transmission of the these embodiments are consistent with commercially available products, however, it is evident that the present invention embodiments manufactured, with this scrim and according to this in-line process, resulted in various composites that demonstrate superior holdout efficiency to "Cedar Tea" which is an evident improvement over the existing products.

Embodiments 29-33 were all fabricated using traditional hot-roll thermal lamination. These embodiments demonstrate the same components laminated at different process conditions (i.e., temperature and speed). High temperatures and slower speeds seem to result in lower rates of moisture vapor transmission probably due to incremental losses in microporosity. It might be beneficial to design in set degrees of MVTR by controlling dwell time (i.e., line speed and temperature) for certain end-use applications. Also, these process parameters can be controlled to induce varied surface characteristics such as gloss and coefficient of friction especially on the nonwoven surface of the tri-laminate structures such as Embodiments 31 & 33. Controlling the coefficient of friction of the nonwoven side of either a bi-laminate or tri-laminate has evident advantages as a method of reducing snag of a cover material while in use such as while wrapping around a corner of a house or over a complex shape such as patio furniture.

Embodiments 34-45 demonstrate the versatility of the present invention to various lamination techniques whereby certain strength characteristics would be required for the specific end-use application. While only two lamination techniques were used herein (i.e., thermal and ultrasonic;) alternative techniques such as adhesive, flame, etc. may also be applicable. It is also conceivable that a final composite could be created in-line after incremental stretching of the microporous-formable precurser, but prior to wind-up. Several alternative strength-enhancing scrims were also trialed in both bi-laminates, which would be more applicable in building product composites, and tri-laminates, which would be applicable in more rugged outdoor cover applications.

Again, variable process conditions such as line speed, nip pressure, and temperature in the case of thermal, and energy input in the case of ultrasonics, may be varied to affect final breathability and surface characteristics. It becomes evident that certain strength enhancing scrims may lend themselves better to one verses another lamination technique as is the case with CLAF® (i.e., Embodiments # 36 & #37) that shows a negative impact that ultrasonics has on the tensile strength of the final composite. Line speed especially, while evaluating thermal lamination, had a drastic impact on the degree of retained MVTR of the final composite.

Several unique and novel modifications of the present invention are shown in Embodiments 46-54. These examples demonstrate a method of imparting radiant barrier protection to the present invention composite by way of vacuum metallization. The uniqueness of this approach is that these composites retain a significant amount of their breathability (i.e., MVTR), which is in contrast to traditional metallization, which more commonly utilizes a monolithic film to support the metal, which is than later laminated in a final composite. Obviously the traditional approach would negate any breathability offered by the composite. Table 3 demonstrates that this technique can be used to create composites that exhibit varying degrees of emissivity based on the thickness of metal applied to the composite. While aluminum was used in these embodiments, it should be evident that other metals and alloys could also be used. Two different environmentally stabilized precursors were used in Embodiments 46-49 as shown in Table 3. It is evident from these examples that the MVTR can be retained regardless of which surface of the precursor is metallized which makes this technique unusually flexible.

It should be evident from these embodiments that the desired strength characteristics, liquid barrier resistance, MVTR, and surface characteristics can be achieved by using one or more strength enhancing scrims laminated in accordance with one or more lamination techniques, the final composite of which would offer the desired level of balanced environmental stability through the use of an incrementally stretched microporous-formable resin that has been compounded with the appropriate level of UV stabilizers, and antioxidants when formed as described by Wu.

TABLE 2

BUILDING PRODUCTS & HIGH STRENGTH OUTDOOR COVERS

| No. | Composite Structure | Lamination Techniques | Tensile Strength md | Tensile Strength xd | MVTR (perms) | Cedar Tea Resistance |
|---|---|---|---|---|---|---|
| 25 | R-Wrap ® (Simplex) | N/a | 36.3 | 31 | 92.3 | <1.5 psi |
| 26 | Tyvek ® HomeWrap ® (DuPont) | N/a | 32 | 26.8 | 82.5 | <2.5 psi |
| 27 | 30 gsm precursor (nonwoven out)//4 × 4 G150 fiberglass scrim w/thermal plastic binder (Conwed Plastics) | In-line during production of scrim | 16.3 | 20.5 | 90.9 | >5 psi |
| 28 | 30 gsm precursor (nonwoven to scrim)//4 × 4 G150 fiberglass scrim w/thermal plastic binder (Conwed Plastics) | In-line during production of scrim | 19.2 | 12.7 | N/t | >5 psi |
| 29 | 30 gsm precursor (nonwoven out)//4 × 4 G150 fiberglass scrim w/thermal plastic binder (Conwed Plastics) | thermal | 13.1 | 19.9 | 79.5 | >4 psi |
| 30 | 30 gsm precursor (nonwoven out)//5 × 6.5 250 denier PET w/thermal plastic binder (Conwed Plastics) | thermal | 24.3 | 20.2 | 96 | >5 psi |
| 31 | 30 gsm precursor (nonwoven out)//5 × 6.5 250 denier PET w/thermal plastic binder (Conwed Plastics) | thermal | 23.7 | 19.2 | 105.9 | >4 psi |
| 32 | 45 gsm precursor (nonwoven out)//5 × 6.5 250 denier PET w/thermal plastic binder (Conwed Plastics)//45 gsm precursor (nonwoven out) | thermal | 23.2 | 28.1 | 37.8 | >5 psi |
| 33 | 30 gsm precursor (nonwoven out)//5 × 6.5 250 denier PET w/thermal plastic binder (Conwed Plastics)//30 gsm precursor (nonwoven out) | thermal | 30.3 | 24.6 | 29.4 | >5 psi |
| 34 | 30 gsm precursor//Typar Style 3201C (Reemay) | ultrasonic | 25.2 | 20.0 | 54%* | N/t |
| 35 | 30 gsm precursor//Typar Style 3201C (Reemay) | thermal | 32.1 | 19.4 | 10.8%* | N/t |
| 36 | 30 gsm precursor//CLAF Style LS (ANCI) | ultrasonic | 17.8 | 15.4 | 52.4%* | N/t |
| 37 | 30 gsm precursor//CLAF Style LS (ANCI) | thermal | 36.6 | 37 | 39.5%* | N/t |
| 38 | 30 gsm precursor//CLAF Style LS (ANCI) | thermal | 41.4 | 37.8 | 24.2%* | N/t |
| 39 | 30 gsm precursor//Typar Style 3201C (Reemay)//30 gsm precursor | ultrasonic | 34.6 | 28.3 | 49.1%* | N/t |
| 40 | 30 gsm precursor//CLAF Style LS (ANCI)// 30 gsm precursor | ultrasonic | 28.1 | 18 | 42.1%* | N/t |

TABLE 2-continued

BUILDING PRODUCTS & HIGH STRENGTH OUTDOOR COVERS

| No. | Composite Structure | Lamination Techniques | Tensile Strength md | Tensile Strength xd | MVTR (perms) | Cedar Tea Resistance |
|---|---|---|---|---|---|---|
| 41 | 30 gsm precursor//CLAF Style LS (ANCI)// 30 gsm precursor | thermal | 45.9 | 42 | 11.7%* | N/t |
| 42 | 30 gsm precursor//CLAF Style LS (ANCI)// 30 gsm precursor | thermal | 48.5 | 44 | 6.4%* | N/t |
| 43 | 30 gsm precursor//CLAF Style LS (ANCI)// 1 oz SBPP | ultrasonic | 24.5 | 16.5 | 56.5%* | N/t |
| 44 | 30 gsm precursor//4 × 3 320 denier stacked, 250 denier PET w/SBR binder// 30 gsm precursor | ultrasonic | 22.0 | 14.8 | 47%* | N/t |
| 45 | 30 gsm precursor//4 × 3 320 denier stacked, 250 denier PET w/SBR binder// 30 gsm precursor | thermal | 22.0 | 14.8 | 47%* | N/t |

TABLE 3

MVTR OF NON-SEPARABLE MICROPOROUS COMPOSITES WITH INCREASES EMISSIVITY

| Aluminum Weight | Bi-laminate precursor made using a 30 gsm coating on a 1.5 oz desert dust SBPP Metallized coating | Bi-laminate precursor made using a 30 gsm coating on a 1.5 oz desert dust SBPP Metallized nonwoven | Tri-Laminate made using a using a 30 gsm coating on a 1.5 oz gray SBPP ultrasonically laminated to a 2.0 z gray SBPP |
|---|---|---|---|
| Light | 38 perms (Emd. #46) | 41 perms (Emb. #49) | 44 perms (Emb. #52) |
| Medium | 39 perms (Emb. #47) | 42 perms (Emb. #50) | 45 perms (Emb. #53) |
| Heavy | 40 perms (Emb. #48) | 43 perms (Emb. #51) | 46 perms (Emb. #54) |

Note:
Tested conducted according to ASTM E96, upright cup method at ambient temp.

Additionally, it will be apparent to one of ordinary skill in the art that modification and variations can be made in the composites of the present invention, and such modifications cer part of this invention. The inventor is, therefore not limited by the specific details and examples described herein.

We claim:

1. A microporous barrier composite, comprising:
a flexible, vapor permeable, substantially liquid impermeable polyolefin barrier layer that comprises an ultraviolet light (UV) stabilizer and a thermal stabilizer; and
a fabric layer;
said composite being incrementally and substantially uniformly stretched along lines that transverse the composite and throughout the depth of the composite to provide microporosity, said lines varying in porosity from one line to another.

2. The microporous barrier composite of claim 1, wherein:
the fabric layer is polyolefin nonwoven fabric.

3. The microporous barrier composite of claim 2, wherein:
the fabric layer comprises at least one of an UV stabilizer and a thermal stabilizer.

4. The microporous barrier composite of claim 1, wherein:
the UV stabilizer in the barrier layer is selected from the group consisting of UV absorbers, hindered amine light stabilizers, or combinations thereof.

5. The microporous barrier composite of claim 1, wherein:
the thermal stabilizer in the barrier layer is selected from the group consisting of phenolic stabilizers, organo phosphorous compounds, lactone and hydroxyl amine radical scavengers.

6. The microporous barrier composite of claim 1, further comprising:
at least one layer of strength-enhancing scrim.

7. The microporous barrier composite of claim 6, wherein the at least one layer of strength-enhancing scrim comprises polyolefin, polyethylene, low density polyethylene, high density polyethylene, metallocenes, polyester, nylon, fiberglass, bicomponent fibers, and blends thereof.

8. The microporous barrier composite of claim 6, wherein the at least one layer of strength-enhancing scrim is ultrasonically, thermally, or adhesively bonded to the barrier layer and the fabric layer.

9. The microporous barrier composite of claim 1, wherein:
the barrier layer comprises a filled polyolefin resin.

10. The microporous barrier composite of claim 9, wherein:
wherein the filled polyolefin resin comprises a filler selected from the group consisting of calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium dioxide, alumina, mica, glass powder, zeolite, silica clay, acetyl salicylic acid, molecular sieves, ion exchange resins, wood pulp, pulp powder, ferrous hydroxide, borox, soda line, alkaline earth metals, baking soda, and activated alumina.

11. The microporous barrier composite of claim 1, wherein:
said composite is a liquid infiltration barrier for building construction.

12. The microporous barrier composite of claim 11, wherein:
said composite is housewrap or a roofing underlayment membrane.

13. The microporous barrier composite of claim 1, wherein:
said composite is an outdoor covering material.

14. The microporous barrier composite of claim 13, wherein:
said composite is a covering for cars, recreational vehicles, outdoor furniture, grills, or boats.

15. The microporous barrier composite of claim 1, wherein the barrier layer comprises:
from about 17 to about 82% by weight of a polyolefin;
from about 17 to about 67% by weight of a filler material;
from about 0.5 to about 2% by weight of an UV stabilizer; and
from about greater than 0 to about 1% by weight of a thermal stabilizer.

16. The microporous barrier of claim 15, wherein the filler material is calcium carbonate.

17. The microporous barrier composite of claim 15, wherein the barrier layer further comprises:
about 4% by weight of a titanium dioxide pigment.

18. The microporous barrier composite of claim 15, wherein the UV stabilizer is a hindered amine light stabilizer, a UVA, or combinations thereof.

19. The microporous barrier composite of claim 15, wherein the thermal stabilizer is selected from the group consisting of phenolic stabilizers, organo phosphorous compounds (i.e., hydroperoxide decomposers), lactone and hydroxyl amine radical scavengers.

20. The microporous barrier composite of claim 1, wherein the barrier layer is a polyethylene composition that comprises about 25 to 60% by weight inorganic filler.

21. The microporous barrier composite of claim 1, wherein the composite is calendared.

22. The microporous barrier composite of claim 1, wherein the composite has a metallized surface.

23. The microporous barrier composite of claim 1, wherein the polyolefin barrier layer comprises about 0.25 to 2.5% by weight of a hindered amine light stabilizer and about 0.25 to 2.5% by weight of a UV stabilizer.

24. A microporous barrier composite, comprising:
a flexible, vapor permeable, substantially liquid impermeable polyolefin barrier layer that comprises an ultra-violet light (UV) stabilizer and a thermal stabilizer; and
a fabric layer;
said composite having a repeating pattern of linear continuums that vary in porosity one continuum to another, the continuums being of substantially uniform porosity along the continuum.

25. A microporous barrier composite, comprising:
a flexible, vapor permeable, substantially liquid impermeable polyolefin barrier layer that comprises an ultra-violet light (UV) stabilizer and a thermal stabilizer; and
a fabric layer;
said composite having areas of a first porosity along lines that transverse the surface of the composite, said areas of a first porosity being separated by areas of a different porosity along lines that transverse the surface of the composite, wherein
the lines that traverse the surface of the composite have substantially uniform porosity along said lines, forming defined areas that alternate in porosity across the surface of the composite.

26. A microporous barrier composite, comprising:
a flexible, vapor permeable, substantially liquid impermeable polyolefin barrier layer that comprises an ultra-violet light (UV) stabilizer and a thermal stabilizer; and
a fabric layer;
said composite having a repeating pattern of stretched linear continuums traversing the composite, and bordered by continuums of increased or decreased porosity from one continuum to the another, the continuums being of substantially uniform porosity along the continuum.

27. A microporous barrier composite, comprising:
a flexible, vapor permeable, substantially liquid impermeable polyolefin barrier layer that comprises an ultra-violet light (UV) stabilizer and a thermal stabilizer; and
a fabric layer;
the barrier layer being extrusion coated onto the fabric layer; and
said composite having differential porosity along stretch lines across the surface of the composite, the stretched lines having substantially uniform porosity along said lines, forming defined areas that alternate in porosity across the surface of the composite.

28. A method for making a microporous barrier composite, comprising:
providing a microporous formable polyolefin blend that comprises a ultra-violet light stabilizer and a thermal stabalizer;
providing a nonwoven fabric;
introducing the polyolefin blend onto the nonwoven fabric to form a non-separable laminate; and
applying an incremental stretching force at below the melting point of said polyolefin blend to the laminate along lines that transverse the laminate to form a microporous barrier composite.

29. The method of claim 28, wherein the fabric layer is polyolefin nonwoven fabric.

30. The method of claim 28, wherein the introducing step comprises extrusion of the polyolefin blend onto the nonwoven fabric.

31. The method of claim 28, wherein the polyolefin blend comprises a filler.

32. The method of claim 28, wherein the fabric layer is a flash-spun high-density polyethylene product.

33. The method of claim 28, further comprising:
laminating said composite to at least one layer of strength-enhancing scrim.

34. The method of claim 33, wherein the at least one layer of strength-enhancing scrim is a flash-spun high-density polyethylene product.

35. The method of claim 33, wherein the at least one layer of strength-enhancing scrim is ultrasonically, adhesively, or thermally laminated to the composite.

36. The method of claim 33, wherein the strength enhancing scrim is laminated off-line from the introducing and applying steps.

37. The method of claim 33, wherein the strength enhancing scrim is laminated in-line after incremental stretching and prior to a final wind-up of the composite.

38. The method of claim 28, further comprising a calendaring step.

39. The method of claim 38, further comprising a metallization step, wherein one or more surfaces of the composite is metallized.

* * * * *

INTER PARTES REEXAMINATION CERTIFICATE (473rd)
United States Patent
Carroll et al.

(10) Number: US 7,501,357 C1
(45) Certificate Issued: Oct. 12, 2012

(54) VAPOR PERMEABLE, LIQUID IMPERMEABLE COMPOSITE FABRIC AND FABRICATION PROCESS

(75) Inventors: Todd R. Carroll, Guntersville, AL (US); John D. Langley, Guntersville, AL (US); Barry S. Hinkle, Guntersville, AL (US)

(73) Assignee: Kappler Inc., Gunterville, AL (US)

Reexamination Request:
No. 95/001,258, Dec. 2, 2009

Reexamination Certificate for:
Patent No.: 7,501,357
Issued: Mar. 10, 2009
Appl. No.: 10/175,325
Filed: Jun. 19, 2002

Related U.S. Application Data

(60) Provisional application No. 60/299,370, filed on Jun. 19, 2001.

(51) Int. Cl.
  *B32B 5/18*  (2006.01)
  *B32B 27/12*  (2006.01)
  *B32B 27/18*  (2006.01)
  *B32B 27/32*  (2006.01)
  *B32B 37/00*  (2006.01)

(52) U.S. Cl. ............ 442/131; 156/229; 442/39; 442/76; 442/394; 442/398

(58) Field of Classification Search .................. None
See application file for complete search history.

(56) References Cited

To view the complete listing of prior art documents cited during the proceeding for Reexamination Control Number 95/001,258, please refer to the USPTO's public Patent Application Information Retrieval (PAIR) system under the Display References tab.

*Primary Examiner* — Norca L Torres Velazquez

(57) ABSTRACT

A flexible, vapor permeable, liquid impermeable composite fabric comprising a ultraviolet light stabilized and thermally stabilized microporous-formable polyolefin barrier layer extrusion laminated to an ultra-violet light stabilized and thermally stabilized polyolefin nonwoven fabric, the composite of which has been incrementally stretched to induce sufficient moisture vapor transmission characteristics while maintaining adequate resistance to water penetration, and methods of making the composite. This composite may be further laminated to one or more layers of either woven or nonwoven materials offering strength and environmental resistance characteristics sufficient for various outdoor applications including covers and building construction products. Embodiments of the above mentioned components have been shown to offer improved liquid resistance, environmental stability, and abrasion resistance as compared to existing commercially available materials.

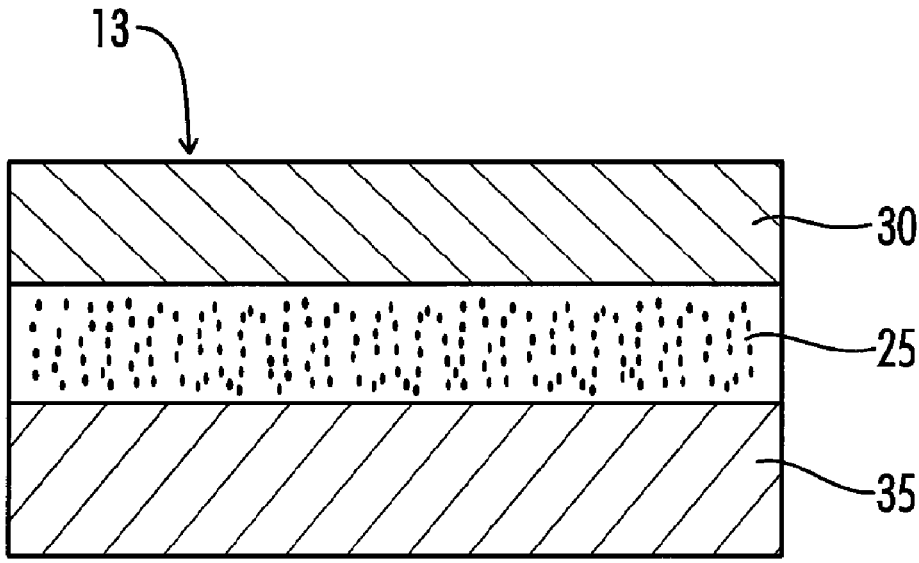

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-39 are cancelled.

\* \* \* \* \*